(12) United States Patent  (10) Patent No.: US 7,428,262 B2
Zancho et al.  (45) Date of Patent: Sep. 23, 2008

(54) CHANNEL ESTIMATION IN A RAKE RECEIVER OF A CDMA COMMUNICATION SYSTEM

(75) Inventors: Bryan W. Zancho, McHenry, IL (US); Christopher P. Larosa, Crystal Lake, IL (US); Alexandre Mallette, Chicago, IL (US); John P. Oliver, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 580 days.

(21) Appl. No.: 10/640,487

(22) Filed: Aug. 13, 2003

(65) Prior Publication Data

US 2005/0036537 A1    Feb. 17, 2005

(51) Int. Cl.
    *H04B 1/707* (2006.01)
(52) U.S. Cl. .................. 375/148; 375/130; 375/144; 375/142; 375/150; 375/316; 455/307; 455/266; 455/130; 455/339; 455/136; 702/149; 702/249
(58) Field of Classification Search .................. 375/142, 375/144, 147, 148, 130, 150, 200, 204, 224, 375/316, 325, 335, 340, 346, 348, 350; 455/130, 455/136, 226.2, 266, 238.1, 277.1, 277.2, 455/307, 339, 423, 425, 506, 522; 702/149, 702/249
    See application file for complete search history.

(56) References Cited

U.S. PATENT DOCUMENTS

| | | | | |
|---|---|---|---|---|
| 4,386,430 A | * | 5/1983 | Treiber | 375/232 |
| 5,293,401 A | | 3/1994 | Serfaty | |
| 5,513,221 A | | 4/1996 | Parr et al. | |
| 5,737,327 A | * | 4/1998 | Ling et al. | 370/335 |
| 5,793,820 A | * | 8/1998 | Vander Mey | 375/350 |
| 5,950,131 A | | 9/1999 | Vilmur | |
| 5,991,332 A | | 11/1999 | Lomp et al. | |
| 6,049,535 A | | 4/2000 | Ozukturk et al. | |
| 6,067,292 A | * | 5/2000 | Huang et al. | 370/342 |
| 6,085,104 A | * | 7/2000 | Kowalski et al. | 455/506 |
| 6,249,682 B1 | * | 6/2001 | Kubo et al. | 455/522 |
| 6,327,314 B1 | | 12/2001 | Cimini, Jr. et al. | |
| 6,377,615 B1 | | 4/2002 | Sourour et al. | |
| 6,493,329 B1 | | 12/2002 | Leung | |
| 6,580,772 B2 | | 6/2003 | Pajukoski | |
| 6,658,045 B1 | * | 12/2003 | Jin | 375/147 |
| 7,012,955 B2 | * | 3/2006 | Lee et al. | 375/224 |
| 7,116,957 B2 | * | 10/2006 | Sih et al. | 455/266 |
| 2002/0036998 A1 | | 3/2002 | Lomp | |
| 2002/0039391 A1 | | 4/2002 | Wang et al. | |
| 2002/0181549 A1 | | 12/2002 | Linnartz et al. | |
| 2002/0181554 A1 | * | 12/2002 | Kim et al. | 375/147 |
| 2003/0078025 A1 | | 4/2003 | Smee et al. | |
| 2003/0198283 A1 | * | 10/2003 | Patel et al. | 375/147 |

\* cited by examiner

*Primary Examiner*—Chieh M. Fan
*Assistant Examiner*—Siu M Lee
(74) *Attorney, Agent, or Firm*—Randall S. Vaas

(57) ABSTRACT

A method and apparatus for channel estimation in a rake receiver of a CDMA communication system operates with a finite-impulse-response channel estimation filter with L taps and having a fixed delay. A pilot sequence of a received sequence of data from a channel of the communication system on the rake receiver is input. A quality of the channel of the communication system is determined using noise or Doppler measurements. These measurements are used in adjusting a bandwidth of the filter to accommodate the channel quality while keeping the fixed delay, which minimizes the delay buffer size. The filter is then used to operate on the received sequence of data to provide coherent modulation.

12 Claims, 4 Drawing Sheets

CHANNEL ESTIMATION IN A RAKE RECEIVER OF A CDMA COMMUNICATION SYSTEM

FIELD OF THE INVENTION

The present disclosure relates generally to wireless communications, and more particularly to channel estimating in wireless communications devices, for example, in a rake receiver of CDMA based user equipment, devices and methods.

BACKGROUND OF THE INVENTION

In a Code Division Multiple Access (CDMA) communication system, all base stations in all cells may use the same radio frequency for communication. Base stations are uniquely identified in the system by uniquely-assigned spreading codes. Two specified pseudorandom noise (PN) sequences of $2^{15}$ bits length are used by all the base stations. In a quadrature modulated system, one sequence is used for the in-phase (I) channel spreading of the I channel symbols and the other is used for the quadrature (Q) channel spreading of the Q channel symbols. Mobile stations in the system possess the same two $2^{15}$ bits length spreading codes and use them for the initial de-spread of the I and Q channels.

The symbols for transmission are spread using a process known as Walsh covering. When in a call, each mobile station is assigned a unique Walsh code by the base site to ensure that transmission to each mobile station within a given cell is orthogonal to transmission to every other mobile station. In addition to traffic channels, each base station broadcasts a pilot channel. The pilot channel is formed by a constant level signal that is covered by Walsh code 0, which consists of all zeros. The pilot channel is commonly received by all mobile stations within range and, among other things, is used by the mobile station for identifying the presence of a CDMA system, identification of initial and delayed rays of communicating and interfering base stations, and for coherent demodulation of the communication channels.

However, the communication channels can be affected by noise, which can be estimated as a signal-to-interference ratio (SIR), also referred to herein as the signal-to-noise ratio (SNR), at the output of the rake receiver. Due to its unique and known nature, the pilot channel can be used to advantage in estimate the channel quality conditions, which can then be used to enhance the communication channels. Channel estimation is an integral part of rake demodulation for Code Division Multiple Access (CDMA) systems such as Third Generation Partnership Project (3GPP) Universal Mobile Telephone System (UMTS) wideband CDMA (WCDMA) and cdma2000 systems. The channel estimator works off of a known pilot sequence to derive a phase reference used for coherent demodulation within each branch (finger) of the rake demodulator.

Referring to FIG. 1, typical CDMA mobile station receivers utilize a rake receiver having three or more (N) independently controlled fingers (branches) which are time aligned to the correct PN sequence phases using knowledge of the pilot channel phases determined by the receiver pilot phase searching element. The rake fingers are normally assigned to the strongest rays received from all communicating base stations as determined by the receiver pilot phase searching element. An incoming quadrature modulated (I+Q) signal is downconverted to a received baseband signal using techniques known in the art. Each finger of the rake receiver operates on the incoming signal with correlators having unique spreading sequences for the pilot and data (traffic) channels. The data correlator detects (despreads) the data information and accumulates it. The pilot correlator detects (despreads) the pilot symbols and accumulates them. The pilot bits can then be used for channel estimation using a channel estimation filter. The filter output, correcting for the estimated channel quality, can then applied to the data symbols using complex conjugation to provide the correction. The channel estimation filter can delay the signal as it is processed so a compensating delay element is used for the data symbols such that the correction is applied coherently. The output from each finger of the rake receiver is then combined after aligning all the signals coherently using individual de-skewer delays for each finger.

A typical channel estimation filter is a finite impulse response (FR) filter that operates by performing a sliding average on the sequence of de-spread pilot symbols, carried on a Common Pilot Channel (CPICH) or on a Dedicated Pilot Channel, which is time multiplexed on a Dedicated Physical Channel (DPCH) in a 3GPP WCDMA system for example. FIG. 2 shows the slot structure for a Common Pilot Channel (CPICH) of a 3GPP WCDMA system. Prior art sliding average channel estimation filters have a delay that varies with the filter length (i.e., delay=one-half filter length). In this case, the channel estimation filter length is set to yield acceptable performance over the full range of expected operating conditions. However, changing the filter bandwidth would most likely cause one or more frame errors. In addition, the delay buffer must be large enough to contain all possible delays that could be encountered, resulting in a very large delay buffer which is costly and takes up much area on an integrated circuit. Moreover, it has been found that Doppler frequency shifts can also affect coherent reception which has not been addressed in the prior art. Although there is a significant amount of prior art on using FIR filters for channel estimation, none of these have a filter length (channel bandwidth) that is varied as a function of Doppler rate.

There is a need for improved channel estimation in a CDMA communication system that further reduces computational complexity and integrated circuit size and cost without sacrificing performance. It would also be of benefit to address Doppler frequency shifts as well as noise.

DETAILED DESCRIPTION OF THE PREFERRED EMBODIMENT

Figure 1:
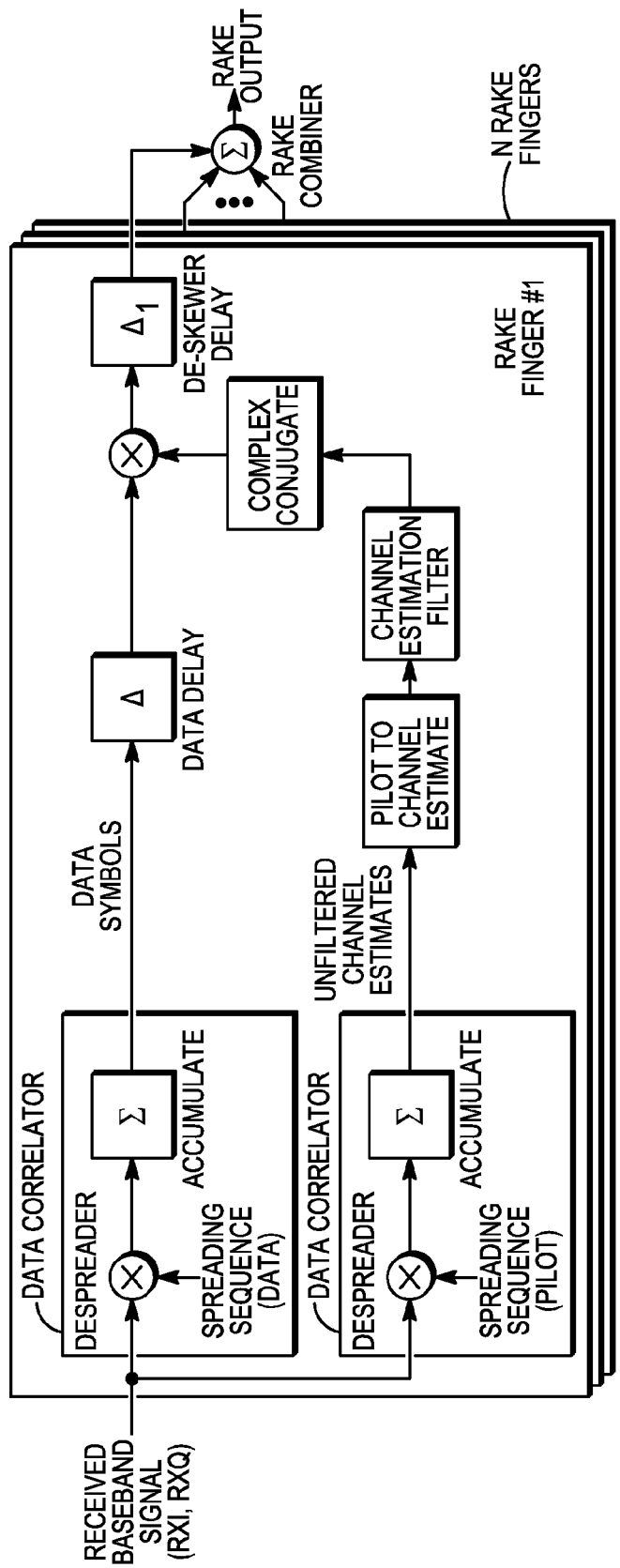
FIG. 1 shows a simplified block diagram of a prior art CDMA rake receiver.
Figure 2:
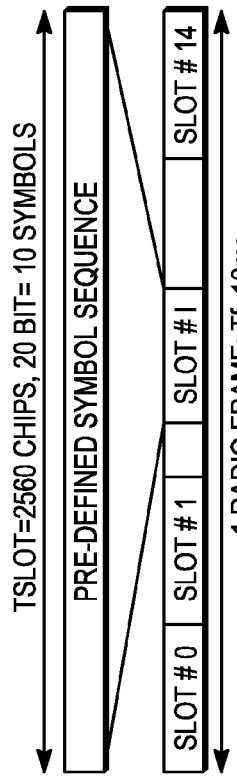
FIG. 2 shows an illustration of the slot structure of a Common Pilot Channel (CPICH) of a 3GPP WCDMA system.

The present invention provides efficient channel estimation in a CDMA communication system without significant computational complexity and reduced the requirement for additional integrated circuit size and cost without sacrificing performance. The present invention also addresses Doppler frequency shifts as well as noise. In particular, the present invention incorporates an implementation of a fixed-delay, sliding average, FIR channel estimation filter in which the filter length (bandwidth) is varied dynamically as a function of the estimated Doppler rate and channel SNR (on a per branch basis) in order to optimize radio link performance. The optimal channel estimation filter bandwidth is a function of Doppler rate (channel bandwidth) and channel SNR.

Algorithms for estimating Doppler rate and channel SIR or SNR are known and can be implemented in software in a processor or digital signal processor (DSP). For example, in calculating SNR, the de-spread symbol for the $k^{th}$ symbol of the $n^{th}$ slot on the $i^{th}$ propagation path of the $l^{th}$ physical channel is represented generally by the following expression:

$$d_l^i[n,k] = a_l[n,k]z_l^i[n,k] + \eta_l^i[n,k],$$

where $a_l[n,k]$ is the normalized (magnitude of one) transmitted symbol, which is known in the case of pilot symbols, and $\eta_l^i[n,k]$ is the noise. The quantity $z_l^i[n,k]$ is the propagation channel, whose magnitude squared represents the received power for the associated propagation path. The de-spread signal can be normalized by the spreading factor.

The estimated signal to noise ratio is based partly upon an estimated noise power estimation after the modulation is removed. The estimated noise power is generally averaged over some time interval. In most applications, the channel may be considered substantially constant over two symbols. The norm of this estimate produces an unbiased estimate of the noise power, which is averaged over time. More generally, the noise power estimate can be based on weighted estimates of noise power on one or more channels, for example, on a Common Pilot Channel (CPICH) or on a Dedicated Pilot Channel, which is time multiplexed on a Dedicated Physical Channel (DPCH) in W-CDMA applications.

Given that there are $N_{PILOT}^l$ (even) pilot symbols per slot on the $l^{th}$ physical channel and where a moving average Finite Impulse Response (FIR) filter is used, the noise power for the $n^{th}$ slot on the $i^{th}$ propagation path is estimated as follows:

$$\hat{\sigma}_{\eta_i^l}^2[n] = \frac{1}{K} \sum_{i=0}^{K-1} \frac{1}{N_{PILOT}^l} \sum_{k=p_{PILOT}^l/2}^{p_{PILOT}^l/2 + N_{PILOT}^l/2 - 1} |a_l[n-i, 2k]^* d_i^l[n-i, 2k] - a_l[n-i, 2k+1]^* d_i^l[n-i, 2k+1]|^2,$$

where K is the number of slots over which the moving average FIR filter filters the noise power estimates. Other filters may be used in other embodiments, for example, multi-pole IIR filters, or more general FIR filters.

The estimated SNR is then determined based upon an estimated signal power estimation, determined in a similar manner as above, but based on weighted estimates of signal power for the data channel, which are coherently averaged. The norm is then taken to generate a biased estimate of the signal power. Preferably, the estimate is then averaged to improve its accuracy. An estimated signal to noise ratio (SNR) is then based upon the estimated signal power and the estimated noise power discussed above, and is used to determine an optimum bandwidth.

Similarly, Doppler shifts can also be determined an incorporated into a calculation for an optimum bandwidth. A Doppler shift is a frequency offset that causes a phase rotation of the modulation at a rate equal to the frequency offset. One hundred eighty degrees of phase rotation will turn a chip transmitted with a value of +1 into a chip received with a value of −1. Thus, when summing chips using a matched filter, there is a practical limit to the number of sequential chips that can be summed and matched, i.e. the required filter bandwidth is affected. For example, with a 2250 Hz Doppler shift, a phase rotation of 90 degrees will occur in 111.1 microseconds. A chip in a CDMA based system has a time length of 0.8138 microseconds. Thus, 136.5 chip times occur in 111.1 microseconds, so 136 chips could be safely summed or matched while maintaining phase coherence.

In accordance with the present invention, the filter bandwidth is dynamically adjustable with no corruption of data while maintaining a fixed delay. An optimal filter bandwidth is determined to meet the SNR and Doppler conditions. Advantageously, by using a fixed delay, the filter conserves power in the receiving communication device and saves calculation complexity. The filter also supports independent bandwidths for each branch of the rake because the SNR of each branch can be different. By doing so, this invention provides improved radio performance with a minimal increase in implementation complexity. The present invention has the further advantage of providing the ability to asymmetrically extend the filter span in slowly varying channels (low Doppler rates) while maintaining a fixed delay.

Figure 3:
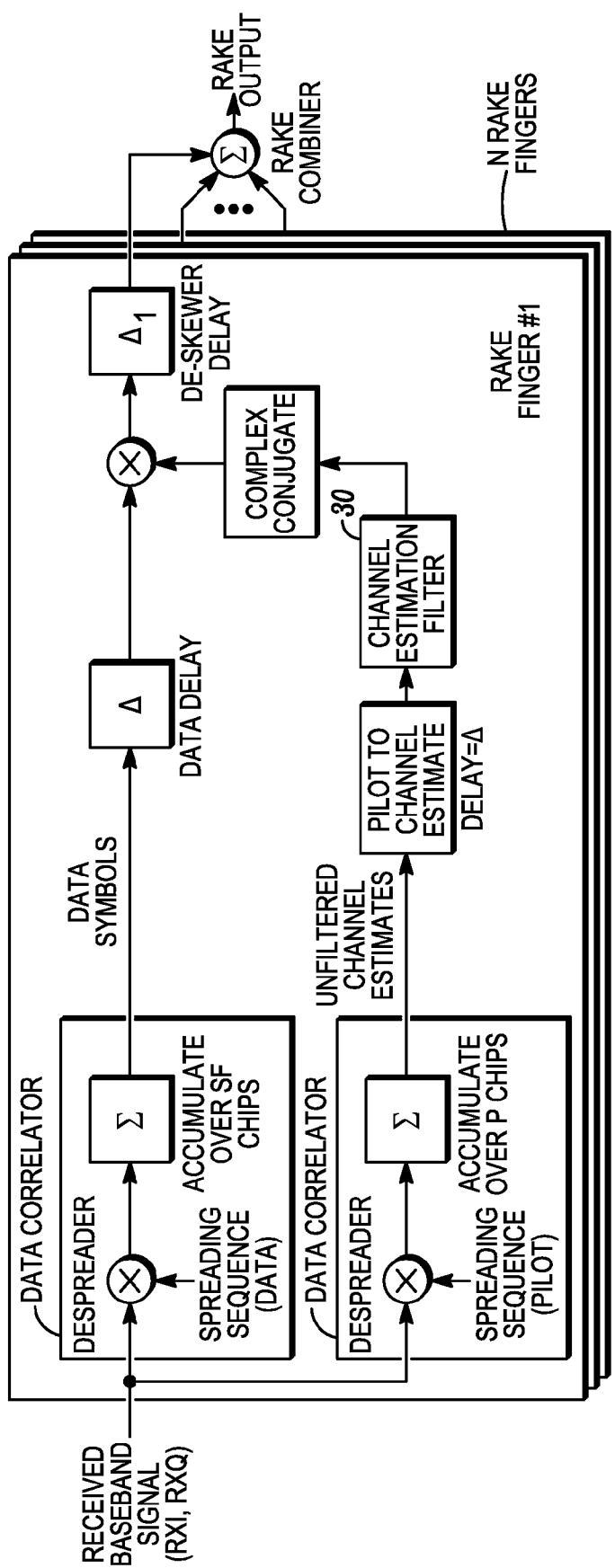
FIG. 3 shows a simplified block diagram of a CDMA rake receiver in accordance with the present invention.
Figure 4:
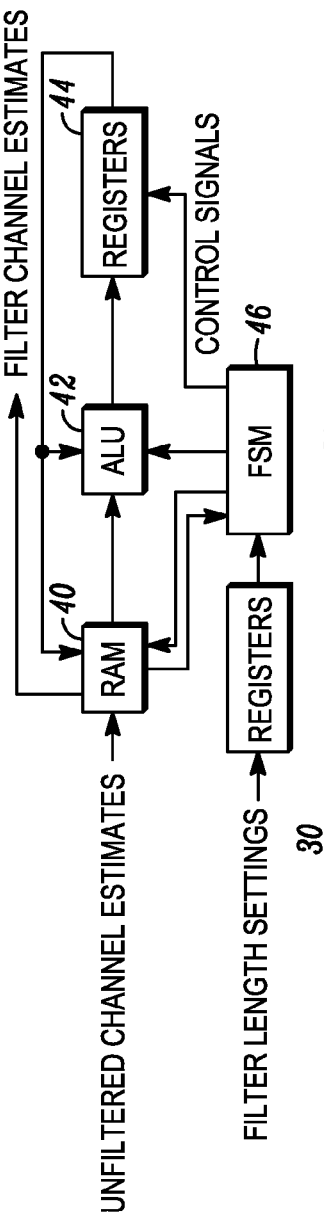
FIG. 4 shows a block diagram of the channel estimation filter of FIG. 3.

Referring to FIG. 3, the basic blocks are the same as for FIG. 1 with the exception of the channel estimation filter 30. The channel estimation filter 30 is a finite impulse response (FIR) filter that operates by performing a sliding average on the sequence of de-spread pilot symbols, carried on a Common Pilot Channel (CPICH) of a 3GPP WCDMA system for example. The channel estimation filter 30 consists of a memory (RAM) for storage of the pilot symbols from the pilot correlator and the channel estimate values determined by the filter 30, a simple arithmetic logic unit (ALU) 42 that allows multiplication by constants and addition, a small bank of Flip-Flops (FFs) 44 for operand storage, and a microprocessor, digital signal processor or finite state machine (FSM) 46 which provides the memory addressing/control, ALU control, and FF control. The memory 40 contains the most recent L+1 pilot symbols (where L is the maximum length of the filter). The channel estimate values are stored in two banks in the memory 40 which allows one bank of channel estimates to stay constant for use by the processor (or FSM) while the other bank of channel estimates is being updated. The banks are swapped at the pilot symbol rate. The channel estimate processing is done non-real-time, but is guaranteed to finish before the memory bank swap. The ALU is time-shared to calculate the channel estimates for each branch of the RAKE with the ability to have a different filter bandwidth setting for each branch. When the bandwidth for a given branch does not change, the circuitry operates in a low power mode wherein one new symbol is added in and one old symbol is subtracted out. However, when there is a change in filter bandwidth, the filter output value is recalculated by summing the necessary group of symbols from the RAM. These calculations are completed for all branches within one pilot symbol period. Each channel estimate is normalized to prevent the relative magnitudes from being affected by filter bandwidth. For example, a constant gain can be achieved by scaling the channel estimate by 1/L (i.e. dividing by the number of taps used for a particular filter bandwidth).

Figure 5:
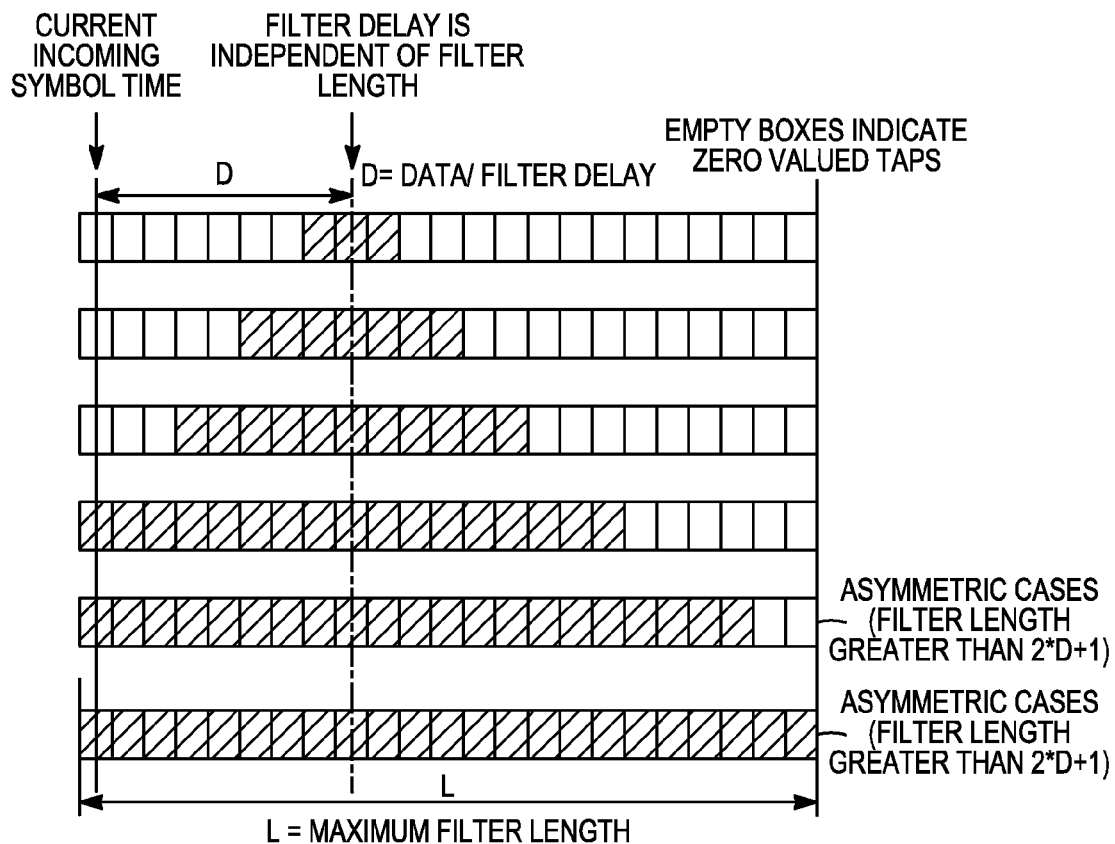
FIG. 5 shows an illustration of the tap applications of the filter of FIG. 4.

FIG. 5 illustrates the tap assignments of a channel estimation filter of set length L. As shown the bandwidth can be adjusted to varying lengths while the delay remains constant. Constant filter delay, D, is maintained for different filter bandwidths (lengths) by having the proper number of zero-valued taps at the beginning and end of the filter. In practice, the filter coefficients applied to each tap are symmetrical about the center of the filter bandwidth with zeros applied to taps outside of the desired bandwidth. Typically, a narrow bandwidth is determined for those cases where the SNR is poor or the Doppler shift is high. In special cases, where a large bandwidth (>2D) is determined (e.g. good SNR or slowly varying channels) the bandwidth can be allowed to become asymmetric about the fixed delay. This is not detrimental to demodulation as channel quality is good in this case, and the receiver can accommodate minor offsets without significant harm.

By utilizing a constant delay FIR filter structure with Finite State Machine (FSM) control, the present invention allows for quick adjustments in filter bandwidth with no corruption of data. The fact that a constant delay (equal to data symbol delay buffer length) is maintained in the channel estimate filter eliminates the problem of adjusting the data symbol delay buffer length upon a bandwidth change, which would cause many symbol errors. The constant channel estimate delay also allows each branch of a rake receiver to have an independent channel estimate bandwidth without complicating data symbol delay buffer addressing. The use of a simple ALU in conjunction with a FSM allows for quick adjustments in filter bandwidth. Instead of having a resetting period equal to the length of the filter (during which the channel estimate would be incorrect), the present invention recalculates the filter value (in a non-real-time manner) within one pilot symbol interval. Having the ability to dynamically adjust the filter length also allows for very low Doppler rate situations to be treated in a special way. In this specific scenario, the filter could be set to lengths greater than 2D where D is the data symbol delay buffer length. Even though the data and channel estimates would no longer be perfectly lined up, the impact of the time offset is minimal (because the channel is slowly varying) and the extra length of the filter is beneficial. Note that it is very desirable to minimize the length of the data delay buffer as it accounts for a large portion of the cost (integrated circuit area) of the rake demodulator.

Figure 7:
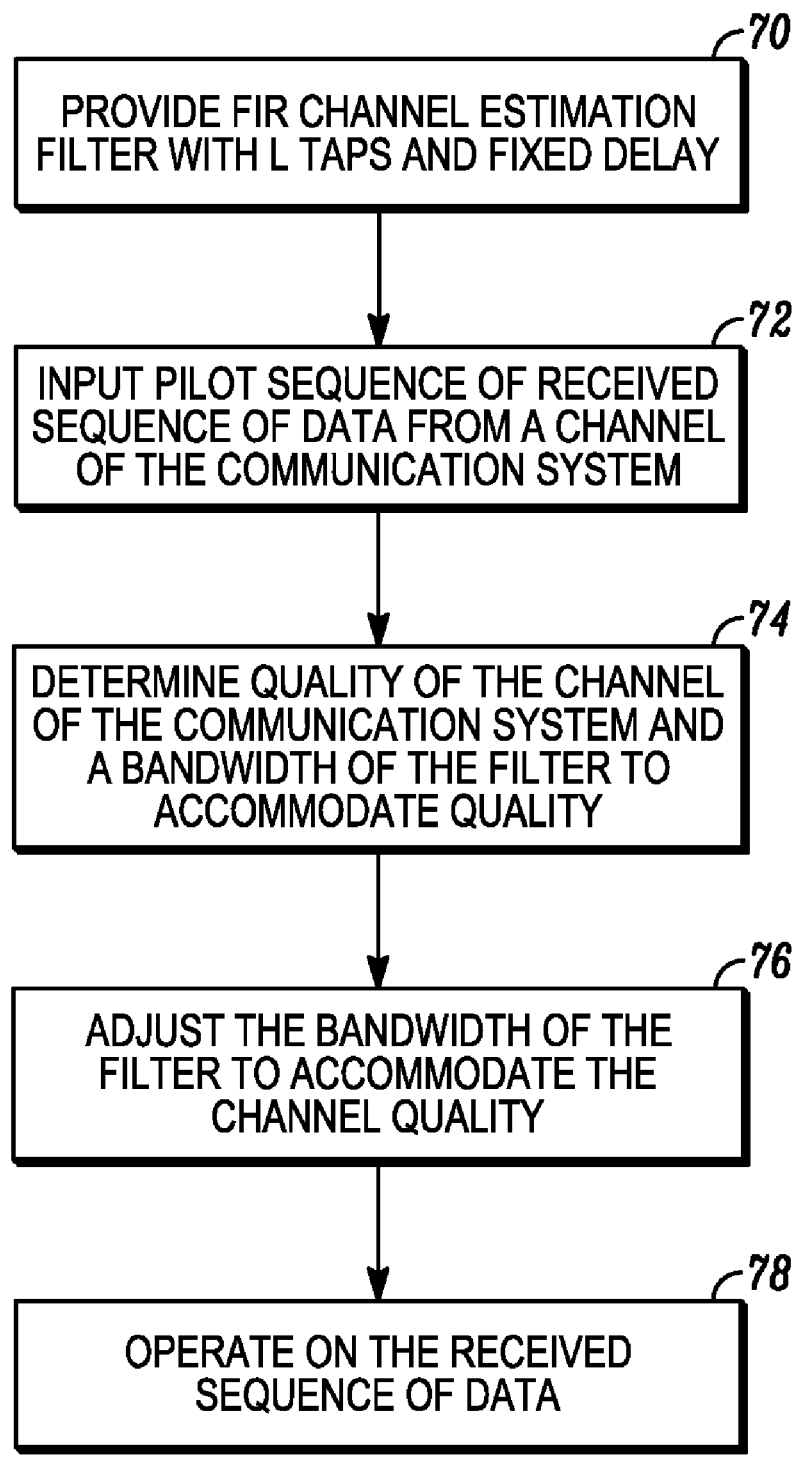
FIG. 7 shows a flowchart of a method in accordance with the present invention.

Referring to FIG. 7, the present invention incorporates a method for channel estimation in a rake receiver of a CDMA communication system. In a first step, the method includes a step 70 of providing a finite-impulse-response channel estimation filter with L taps and having a fixed delay. A next step 72 includes inputting a pilot sequence of a received sequence of data from a channel of the communication system on the rake receiver. A next step 74 includes determining a quality of the channel of the communication system and a bandwidth of the filter to accommodate the channel quality. Preferably, channel quality is determined from one or both of a signal-to-noise ratio of the channel and a Doppler frequency shift of channel. More preferably, this step 74 includes calculating the filter coefficients within one pilot symbol interval. A next step 76 includes adjusting the bandwidth of the filter to accommodate the channel quality while keeping the fixed delay. A next step 78 includes operating on the received sequence of data with the channel estimation filter.

Preferably, the determining step 74 includes calculating the filter coefficients for an optimal bandwidth, and the adjusting step 76 includes applying the filter coefficients to the taps in a symmetrical manner about the fixed delay while applying zeros to those taps outside of the bandwidth. Optionally, the determining step 74 includes calculating the filter coefficients for an optimal bandwidth, and the adjusting step 76 includes applying the filter coefficients to the taps in an asymmetrical manner about the delay while applying zeros to any taps above the bandwidth if the number of coefficients exceeds twice the delay. This is useful for slowly varying channels conditions where the misalignment is not detrimental.

In practice, these steps 70-78 are performed independently for all fingers of the rake receiver such that the operating step results in coherent demodulation of the received sequence of data in the rake receiver.

In order to maintain the optimal filter length over the full range of Doppler rates and channel SNRs, the present invention provides that filter bandwidth is dynamically adjusted. In particular, for a given Doppler shift, a good SNR can use more filter taps than a poor SNR. Similarly, for a given SNR, a low Doppler shift can use more filter taps (and asymmetrical bandwidth) than a high Doppler shift. The filter can also support independent bandwidths for each branch of the rake receiver because the SNR for each branch can be different.

EXAMPLE

It is known that if a single bandwidth channel estimation filter is used, there can be significant BER degradation at extreme Doppler rate and/or SNR conditions. A numerical simulation was performed using the finite-impulse-response channel estimation filter with fixed delay and dynamic bandwidth, in accordance with the present invention. The results are provided below. Simulation data, as is known in the industry, was used in the numerical simulation for all simulations. In particular, degradation was determined with respect to ideal channel estimation at a SFER=1%, Ior/Ioc=0 dB, flat fading channel and DPCH=12.2 kbps.

Figure 6:
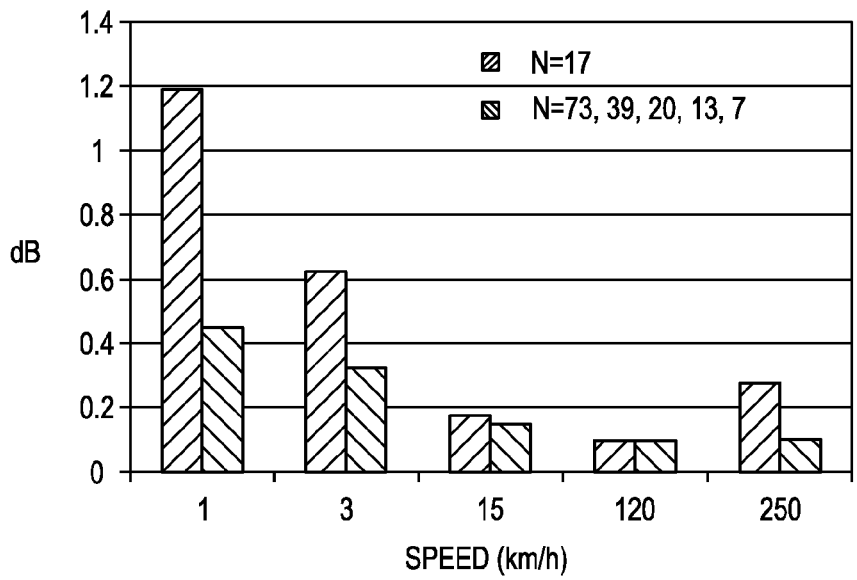
FIG. 6 shows a graph of the improvement provided by the present invention.

FIG. 6 shows a graph of the results indicating channel degradation (dB) versus Doppler shift due to the speed indicated. In the first column, tested at a speed of 1 km/h, a test was conducted using a filter of fixed seventeen taps (symbol length) versus the present invention wherein a filter length dynamically adjusted (asymmetrically) to seventy-three taps. In the second column, tested at a speed of 3 km/h, a test was conducted using a filter of fixed seventeen taps versus the present invention wherein a filter length dynamically adjusted to thirty-nine taps. In the third column, tested at a speed of 15 km/h, a test was conducted using a filter of fixed seventeen taps versus the present invention wherein a filter length dynamically adjusted to twenty taps. In the fourth column, tested at a speed of 120 km/h, a test was conducted using a filter of fixed seventeen taps length versus the present invention wherein a filter length dynamically adjusted to thirteen taps. In the last column, tested at a speed of 250 km/h, a test was conducted using a filter of fixed seventeen taps versus the present invention wherein a filter length dynamically adjusted to seven taps.

As can be seen, the present invention provides less degradation at conditional extremes over the prior art constant length filter. Also, in the more common condition such as a car driving down the road at 120 km/h, the present invention provide similar results as the prior art. In addition, this is accomplished with fewer calculations as described previously. The use of a fixed delay results in better performance at the expense of more cost and calculations.

In review, the present invention provides channel estimation in a CDMA communication system using a channel estimate filter that reduces computational complexity without sacrificing performance. Advantageously, the present invention provides an improvement over the prior art due to the simplification of computations using a fixed delay. In addition, the present invention provides a dynamically adjustable bandwidth with allowances for the bandwidth to become asymmetric around the delay.

What is claimed is:

1. A method for channel estimation in a rake receiver of a CDMA communication system, the method comprising the steps of:
providing a finite-impulse-response channel estimation filter with L taps and having a fixed delay;
inputting a pilot sequence of a received sequence of data from a channel of the communication system on the rake receiver;
determining a quality of the channel of the communication system and a bandwidth of the filter to accommodate the channel quality;
adjusting the bandwidth of the filter to accommodate the channel quality while keeping the fixed delay; and
operating on the received sequence of data with the channel estimation filter;
wherein the determining step includes calculating the filter coefficients for a filter length, and wherein if the number of coefficients calculated correspond to a length that exceeds twice the fixed delay, the adjusting step includes applying the filter coefficients to the taps in an asymmetrical manner about the filter delay over the filter length while applying zeros to the taps outside the filter length.

2. The method of claim 1, wherein the determining step includes measuring a signal-to-noise ratio of the channel.

3. The method of claim 1, wherein the determining step includes measuring a Doppler frequency shift.

4. The method of claim 1, wherein the determining step includes measuring a signal-to-noise ratio and a Doppler frequency shift.

5. The method of claim 1, wherein if the number of coefficients is less than twice the delay, the determining step includes calculating the filter coefficients for a bandwidth, and wherein the adjusting step includes applying the filter coefficients to the taps in a symmetrical manner about the fixed delay while applying zeros to those taps outside of the filter length.

6. A method for channel estimation in a rake receiver of a CDMA communication system, the method comprising the steps of:
providing a finite-impulse-response channel estimation filter with L taps and having a fixed delay;
inputting a pilot sequence of a received sequence of data from a channel of the communication system on the rake receiver;
determining a quality of the channel of the communication system and a bandwidth of the filter and filter coefficients therefor to accommodate the channel quality;
adjusting the bandwidth of the filter to accommodate the channel quality while keeping the fixed delay; and
operating on the received sequence of data with the channel estimation filter;
wherein when the determining step indicates a low Doppler rate the adjusting step includes applying the filter coefficients to the taps in an asymmetrical manner around the fixed delay while applying zeros to those taps outside the filter length.

7. The method of claim 6, wherein in the determining step the quality of the channel is determined by at least one of the group of a signal-to-noise ratio and a Doppler frequency.

8. A method for channel estimation in a rake receiver of a CDMA communication system, the method comprising the steps of:
providing a finite-impulse-response channel estimation filter with L taps and having a fixed delay;
inputting a pilot sequence of a received sequence of data from a channel of the communication system on the rake receiver;
determining a quality of the channel of the communication system and a bandwidth of the filter and filter coefficients therefor to accommodate the channel quality;
adjusting the bandwidth of the filter to accommodate the channel quality while keeping the fixed delay; and
operating on the received sequence of data with the channel estimation filter;
wherein the determining step includes calculating the filter coefficients within one pilot symbol interval; and
wherein the adjusting step includes applying the filter coefficients to the taps in a symmetrical manner about the fixed delay while applying zeros to those taps outside the filter span.

9. A rake receiver of a CDMA communication system with improved channel estimation, the rake receiver having at least one receiver finger comprising:
a finite-impulse-response channel estimation filter with L taps and having a fixed delay;
a memory coupled to the filter, the memory storing pilot symbols and channel estimation values from the filter;
an arithmetic logic unit (ALU) coupled to the filter;
a bank of flip-flops coupled to the arithmetic logic unit; and
a processor that provides memory addressing, ALU control, and flip-flop control;
wherein the ALU is time-shared to calculate the channel estimates for each finger of the rake receiver and allowing a different filter bandwidth for each finger; and
wherein the memory include two banks, a first bank includes channel estimates that are kept constant for use by the processor while a second bank of channel estimates is being updated by the filter, and wherein the memory banks are swapped at a pilot symbol rate.

10. A rake receiver of a CDMA communication system with improved channel estimation, the rake receiver having at least one receiver finger comprising:
a finite-impulse-response channel estimation filter with L taps and having a fixed delay;
a memory coupled to the filter, the memory storing pilot symbols and channel estimation values from the filter;
an arithmetic logic unit (ALU) coupled to the filter;
a bank of flip-flops coupled to the arithmetic logic unit; and
a processor that provides memory addressing, ALU control, and flip-flop control;
wherein when a bandwidth of a finger does not change the filter operates to add in one new pilot symbol while subtracting out one old pilot symbol, and when the bandwidth of a finger does change an output of the filter is recalculated by summing the symbols in the memory.

11. The rake receiver of claim 10, wherein the processor calculates the filter coefficients for a bandwidth and applies the filter coefficients to the taps in a symmetrical manner about the fixed delay while applying zeros to the remaining taps to those taps outside the filter span.

12. A rake receiver of a CDMA communication system with improved channel estimation, the rake receiver having at least one receiver finger comprising:
a finite-impulse-response channel estimation filter with L taps and having a fixed delay;

a memory coupled to the filter, the memory storing pilot symbols and channel estimation values from the filter;

an arithmetic logic unit (ALU) coupled to the filter;

a bank of flip-flops coupled to the arithmetic logic unit; and a processor that provides memory addressing, ALU control, and flip-flop control;

wherein the processor calculates the filter coefficients for a bandwidth and applies the filter coefficients to the taps in an asymmetrical manner about the fixed delay while applying zeros to those taps outside the filter length if the number of coefficients exceeds twice the delay.

* * * * *